United States Patent [19]

Fujiwara

[11] Patent Number: 5,748,771
[45] Date of Patent: May 5, 1998

[54] LOOK-UP TABLE FORMING METHOD AND DEVICE

[75] Inventor: Shirou Fujiwara, Tokyo, Japan

[73] Assignee: NEC Corporation, Tokyo, Japan

[21] Appl. No.: 561,898

[22] Filed: Nov. 22, 1995

[30] Foreign Application Priority Data

Nov. 24, 1994 [JP] Japan .................................. 6-288510

[51] Int. Cl.$^6$ .......................................................... G06K 9/00
[52] U.S. Cl. .................................................. 382/168; 382/162
[58] Field of Search ........................................ 382/162, 168, 382/273; 358/520–523

[56] References Cited

U.S. PATENT DOCUMENTS

| | | | |
|---|---|---|---|
| 4,941,037 | 7/1990 | Sasaki et al. | 358/80 |
| 5,347,374 | 9/1994 | Fuss et al. | 358/522 |
| 5,377,025 | 12/1994 | Spaulding et al. | 358/518 |
| 5,608,851 | 3/1997 | Kobayashi | 395/131 |

FOREIGN PATENT DOCUMENTS 63-304384  12/1988  Japan .
01-092787  4/1989  Japan .
03-113682  5/1991  Japan .

*Primary Examiner*—Edward L. Coles, Jr.
*Assistant Examiner*—Stephen Brinich
*Attorney, Agent, or Firm*—Foley & Lardner

[57] ABSTRACT

In look-up table forming method and device, superordinate bits (4 bits) of brightness data and superordinate bits (2 bits) of each of a pair of color difference data are extracted from original image data comprising brightness data (8 bits) and a pair of color difference data (respective 8 bits) of each picture element to form entry addresses (each 8 bits) (classify the colors of an original image into 256 color blocks), a color histogram representing a frequency distribution of a color (16 bits) is formed on the basis of subordinate bits (4 bits) of the brightness data and subordinate bits (respective 6 bits) of each of the pair of the color difference data, and a color having the maximum frequency is selected as a representative color every entry address on the basis of the color histogram, thereby forming a look-up table.

8 Claims, 3 Drawing Sheets

LOOK-UP TABLE FORMING METHOD AND DEVICE

BACKGROUND OF THE INVENTION

1. Field of the Invention

The present invention relates to look-up table forming method and device, and particularly to look-up table forming method and device which are suitably used to approximately display an image of 16,700,000 colors with 256 colors.

2. Description of the Related Art

When a full color image of $2^{24}$ colors (i.e., of a color image of about 16,700,000) is picked up by a color image scanner or the like, is subjected to image processing by a computer graphics technique or the like, an approximate color (or color-restricted) display has been usually performed by using a look-up table in order to save the capacity of a frame memory in which image data are stored.

It is general that the table content of a look-up table is defined so that three primary color components of R, G and B are equivalently distributed therein. However, in a case where an original image contains a large amount of picture elements which are concentrated on a specific color component of the primary color components of R, G and B, the approximate display is made on the original image without effectively using all representative colors which are registered in a look-up table, so that approximation precision is reduced.

In order to overcome this problem, Japanese Laid-open Patent Application No. Hei-3-113682 proposes a look-up table forming device of forming a three-dimensional color histogram of input original image data of R, G and B, and selectively registering the data of the color histogram in the order of the appearing frequency of the data in the look-up table.

FIG. 3 shows this type of a look-up table forming device 12. As shown in FIG. 3, the look-up table forming device 12 is disposed between an original image input unit 11 and a display unit 17. The data of an original full color image which is input from the original image input unit 11 to the look-up table forming device 12 are first used to form a color histogram representing a three-dimensional color distribution of R, G and B in a color histogram generating means 13.

The color histogram which is generated by the color histogram generating means 13 is sorted in the order from a larger frequency to a smaller frequency by a color histogram sorting means 14. Subsequently, a desired number of representative colors are selected in the order of the appearing frequency of colors in the histogram (from a larger frequency to a smaller frequency) by a look-up table generating means 15, thereby completing the formation of a look-up table.

The look-up table generating means 15 is connected to an approximate image data generating means 16 for generating approximate image data while applying the look-up table to each picture element of the original image data, and an approximate image which is generated by the approximate image data generating means 16 is output to and displayed in the display unit 17.

In the conventional look-up table forming device as described above, with respect to a color distribution of an original image which comprises 882×708 picture elements and uses 8 bits for each picture element of R, G, B, each of picture element data is first plotted in a three-dimensional color space of R, G, B while one picture element corresponds to one point. Thereafter, the three-dimensional color space is divided into small blocks of 4096 (each representative color is selected from each block) while each axis is sectioned into 16 stages, and then the frequency of each representative color in a three-dimensional color histogram is counted every block to check which one of representative colors of 4096 is usable to approximate each picture element of the original image.

The three-dimensional color histogram is established by performing the above frequency counting processing for all the picture elements, and color data having the highest appearing frequency is set as a representative color every block, and thus the look-up table is formed.

However, a remarkably large processing load must be imposed to dispose all the picture elements of 882×708 each of which potentially has $2^{24}$ colors, that is, 16,700,000 colors. In addition, each of the picture elements of 882×708 disposed in the three-dimensional color space must be selectively allocated to any one of the 4096 blocks, and the color data having the highest appearing frequency must be found out every block. Such works need to deal with a large amount of data, and thus a long processing time is required to deal with the data. Furthermore, a buffer memory for temporarily storing the data during the processing must have a remarkably large memory capacity. Accordingly, a total look-up table forming cost containing the processing time rises up.

SUMMARY OF THE INVENTION

An object of the present invention is to provide look-up table forming method and device which is capable of efficiently forming an approximate image which is faithful to the color distribution of the original image, without increasing the forming cost.

In order to attain the above object, according to one aspect of the present invention, a look-up table forming method comprises the steps of: extracting superordinate bits of brightness data and superordinate bits of each of a pair of color difference data from image data in which totally (n+m) bits are allocated to both of brightness data and a pair of color difference data of each picture element, thereby forming an entry address of n bits (n,m represents a positive integer); forming a color histogram representing a frequency distribution of a color of m bits on the basis of subordinate bits of the brightness data and subordinate bits of each of the pair of the color difference data in the image data which are roughly classified into $2^n$ colors; selecting a color having the maximum frequency as a representative color every entry address on the basis of the color histogram; and registering the representative color every entry address to form a look-up table.

According to another aspect of the present invention, a look-up table forming device comprises: means of extracting superordinate bits of brightness data and superordinate bits of each of a pair of color difference data from image data in which totally (n+m) bits are allocated to both of brightness data and a pair of color difference data of each picture element, thereby forming an entry address of n bits (n,m represents a positive integer); means of forming a color histogram representing a frequency distribution of m bits on the basis of subordinate bits of the brightness data and subordinate bits of each of the pair of the color difference data in the image data which are roughly classified into $2^n$ colors; means of selecting a color having the maximum frequency as a representative color every entry address on the basis of the color histogram; and means of registering the representative color every entry address to form a look-up table.

The look-up table forming device as described above may be equipped with a counter for counting the frequency of the color of m bits.

According to another aspect of the present invention, a look-up table forming method comprises the steps of: extracting superordinate 4 bits of brightness data and superordinate 2 bits of each of a pair of color difference data from image data in which 8×3 (=24) bits are totally allocated to both of brightness data of 8 bits and a pair of respective 8-bit color difference data of each picture element, thereby forming an entry address of 8 bits; forming a color histogram representing a frequency distribution of a color of 16 bits on the basis of subordinate 4 bits of the brightness data and subordinate 6 bits of each of the pair of the color difference data in the image data which are roughly classified into 256 colors; selecting a color having the maximum frequency as a representative color every entry address on the basis of the color histogram; and registering the representative color every entry address to form a look-up table.

According to another aspect of the present invention, a look-up table forming device comprises: means of extracting superordinate 4 bits of brightness data and superordinate 2 bits of each of a pair of color difference data from image data in which 8×3 (=24) bits are allocated to both of brightness data of 8 bits and a pair of respective 8-bit color difference data of each picture element, thereby forming an entry address of 8 bits; means of forming a color histogram representing a frequency distribution of a color of 16 bits on the basis of subordinate 4 bits of the brightness data and subordinate 6 bits of each of the pair of the color difference data in the image data which are roughly classified into 256 colors; means of selecting a color having the maximum frequency as a representative color every entry address on the basis of the color histogram; and means of registering the representative color every entry address to form a look-up table.

The look-up table forming device as described above may be, equipped with a counter for counting the frequency of the color of 16 bits.

The inventor of this application has found out that brightness signal and color difference signals of image information are closer to a human's visual sense in variation degree of numerical values than primary color signals of red, green, blue (R,G,B) or complementary color signals of yellow, magenta, cyan (Y,M,C), and thus a look-up table (LUT) is formed on the basis of a combination of superordinate bits of the brightness signal and the color difference signals and a combination of subordinate bits thereof.

According to the look-up table forming method of the present invention, superordinate bits of the brightness data and superordinate bits of each of the pair of color difference data are extracted from the image data in which totally (n+m) bits are allocated to both of the brightness data and the pair of color difference data of each picture element, thereby forming an entry address of n bits (n,m represents a positive integer). Subsequently, a color histogram representing a frequency distribution of a color of m bits is formed on the basis of subordinate bits of the brightness data and subordinate bits of each of the pair of the color difference data for the image data which are roughly classified into $2^n$ colors. Thereafter, a color having the maximum frequency is selected as a representative color every entry address to form a look-up table. Therefore, an original image can be effectively and approximately displayed by using a look-up table that uses a restricted memory capacity.

DETAILED DESCRIPTION OF THE PREFERRED EMBODIMENT

A preferred embodiment according to the present invention will be described with reference to the accompanying drawings.

Figure 1:
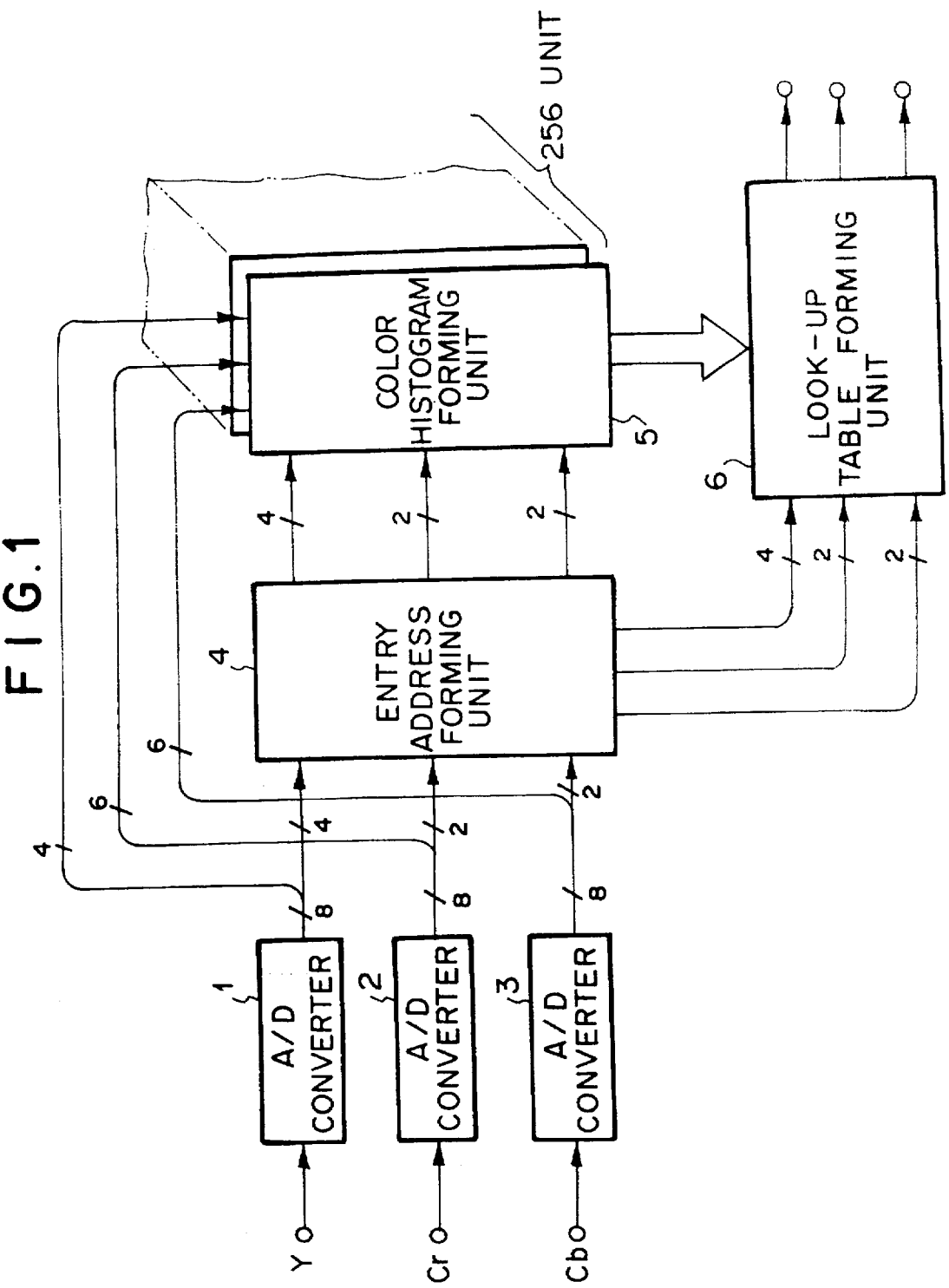
FIG. 1 is a block diagram showing the construction of a look-up table forming device according to an embodiment of the present invention.

FIG. 1 is a block diagram showing the construction of a look-up table forming device of an embodiment according to the present invention.

In FIG. 1, a look-up table forming device of this embodiment includes A/D (analog-to-digital) converters 1 to 3, an entry address forming unit 4, a color histogram forming unit 5 and a look-up table forming unit 6.

The A/D converter 1 converts analog brightness data Y into 8-bit digital data, the A/D converter 2 converts analog color difference data Cr (R−Y) of Red into 8-bit digital data and the A/D converter 3 converts analog color difference data Cb (B−Y) of blue into 8-bit digital data, and these converted digital data are output to each of the entry address forming unit 4 and the color histogram forming unit 5.

The entry address forming unit 4 forms an entry address from digital data of superordinate 4 bits of the brightness data Y from the A/D converter 1, digital data of superordinate 2 bits of the red color difference data Cr from the A/D converter 2, and digital data of superordinate 2 bits of the blue color difference data Cb from the A/D converter 3.

The color histogram forming unit 5 forms a color histogram on the basis of digital data of subordinate 4 bits of the brightness data Y from the A/D converter 1, digital data of subordinate 6 bits of the red color difference data Cr from the A/D converter 2, digital data of subordinate 6 bits of the blue color difference data Cb from the A/D converter 3, and the entry address from the entry address forming unit.

The look-up table forming unit 6 writes color data having the maximum appearing frequency (data of a color which appears at the maximum frequency) as a representative color into a look-up table (not shown) every entry address on the basis of the entry address from the entry address forming unit 4.

Figure 2:
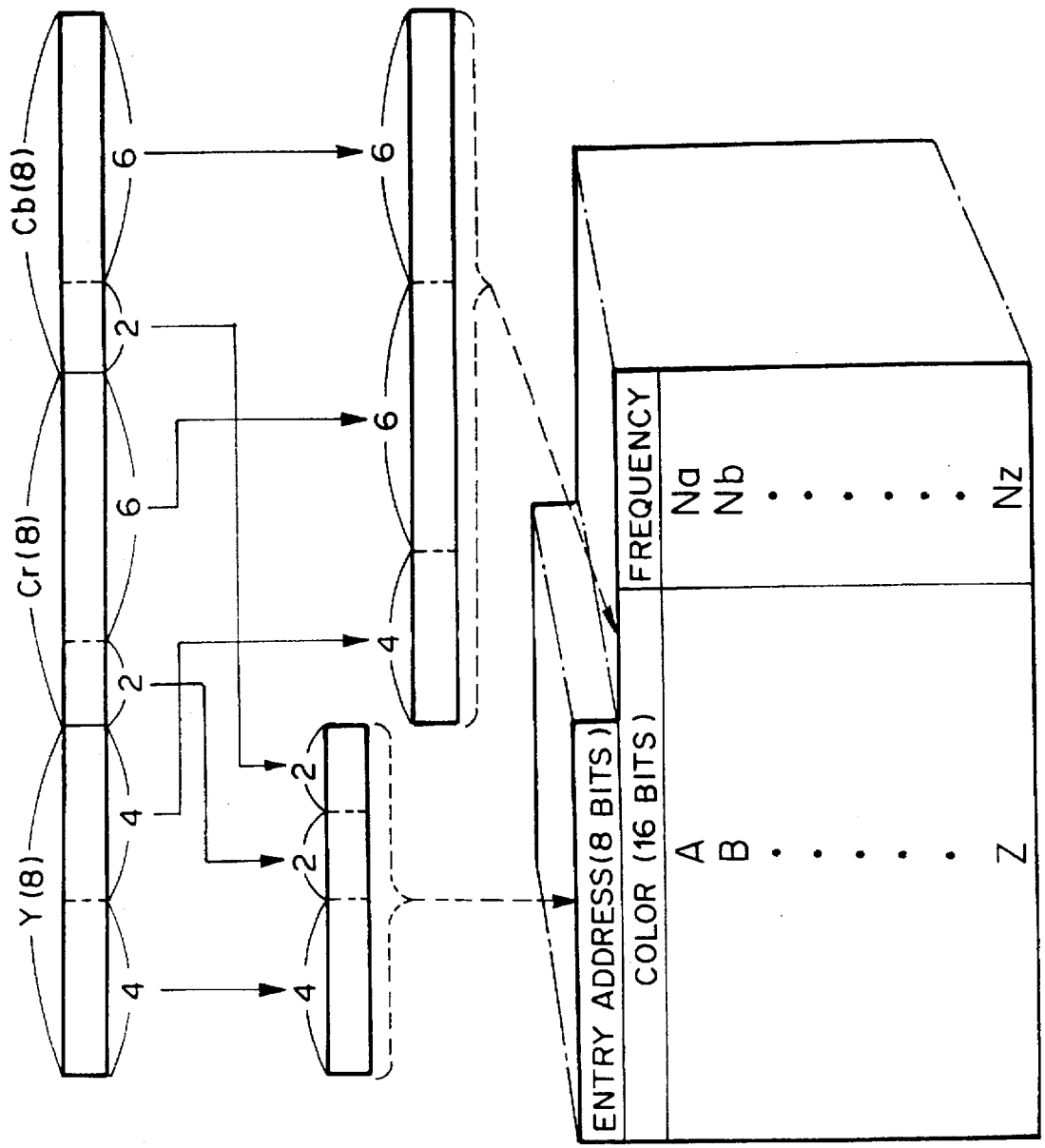
FIG. 2 is a diagram showing a color histogram forming principle in a color histogram forming unit shown in FIG. 1.
Figure 3:
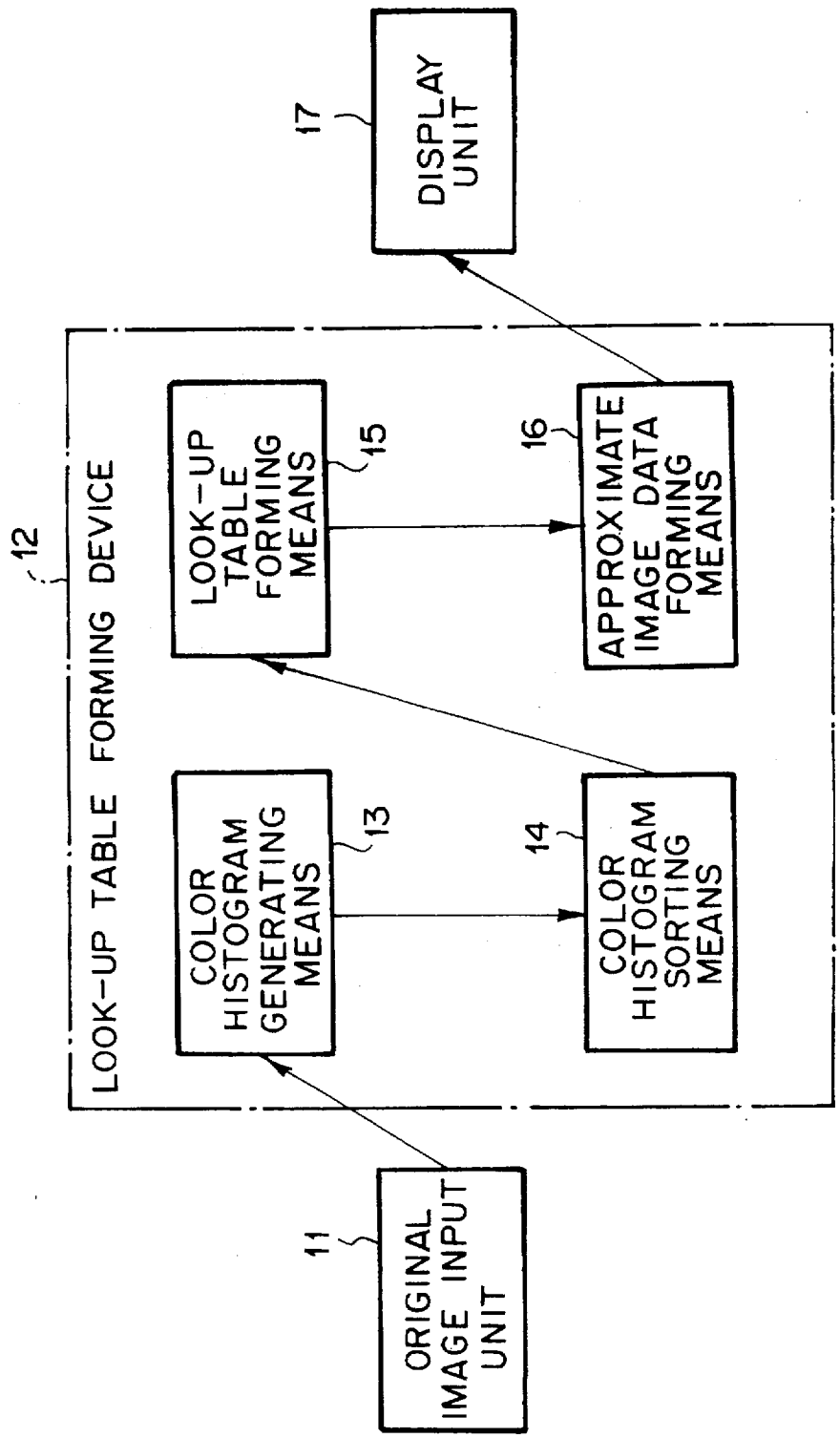
FIG. 3 is a block diagram showing the construction of a conventional look-up table forming device.

FIG. 2 is a diagram showing the principle of forming the color histogram in the color histogram forming unit 5. The principle of the formation of the color histogram in the color histogram forming unit 5 will be described with reference to FIG. 2.

Every 8-bit entry address which is formed from the superordinate 4 bits of the brightness data and the superordinate 2 bits of each of the respective color difference data Cr,Cb in the entry address forming unit 4, the color histogram forming unit 5 forms a color histogram by arranging colors of 16 bits each comprising the subordinate 4 bits of the brightness data Y and the subordinate 6 bits of each of the respective color difference data Cr,Cb, that is, colors A to Z contained in an actual image in the order from a larger appearing frequency to a smaller appearing frequency like Na, Nb, . . . , Nz.

Next, the formation of the look-up table according to the embodiment of the present invention will be described in detail with reference to FIGS. 1 and 2.

The entry address forming unit 4 forms an entry address of 8 bits by extracting superordinate 4 bits of brightness data and superordinate 2 bits of each of a pair of color difference data from image data in which totally 8×3 bits are allocated to both of the brightness data and the pair of color difference data of each picture element. Therefore, the original image data of 16,700,000 colors are roughly classified into $2^8$ colors (that is, 256 colors), whereby the approximate color display has been prepared.

The color histogram forming unit 5 forms a color histogram representing a frequency distribution of 16-bit colors on the basis of subordinate 4 bits of the brightness data and subordinate 6 bits of each of the respective color difference data Cr,Cb. The color histogram is formed by arranging, every entry address, the colors A to Z contained in an actual image in the order from a larger appearing frequency to a smaller appearing frequency like Na, Nb, . . . , Nz. A counter (not shown) for counting the appearing frequency of the colors is built in the color histogram forming unit 5.

That is, one of the 256 entry addresses has 65536 ($=2^{16}$) kind colors of residual subordinate 4 bits of the brightness data and residual subordinate 6 bits of each of the respective color difference data Cr, Cb, before allocating from the original image. Accordingly one address of the 256 entry addresses is selected one color of the maximum frequency in the 65536 kind colors of subordinate 4 bits of the brightness data and subordinate 6 bits of each of the respective color difference data Cr, Cb, and is allocated the one color. Therefore, the one color is the representative color, and then the 256 entry addresses are allocated in order to each a maximum frequency according to the same method.

The look-up table forming unit 6 forms the look-up table by selecting a color having the maximum frequency as a representative color every entry address on the basis of the color histogram which is formed by the color histogram forming unit 5.

Therefore, each of color data (each comprises brightness data of 4 bits and respective color difference data Cr,Cb each comprising 6 bits) which are most suitable as approximate colors is stored at each of entry addresses of 256 in the look-up table formed by the look-up table forming unit 6.

The look-up table is formed every original image of, for example, every frame or every field. Specifically, the data of each original image in which 24 bits are allocated to 8-bit brightness data Y and each of a pair of respective 8-bit color difference data Cr,Cb for each picture element are supplied to the entry address forming unit 4, and the superordinate 4 bits of the brightness data Y and the superordinate 2 bits of each of the respective color difference data Cr, Cb are extracted to form an entry address of 8 bits as shown in FIG. 2.

That is, in the entry address forming unit 4, the colors of all picture elements are classified into $2^8$ colors with the superordinate 4 bits of the brightness data Y and the respective superordinate 4 bits of the pair of the color difference data Cr,Cb of the respective picture elements. Furthermore, in the color histogram forming unit 5, the residual subordinate 4 bits of the brightness data Y and the residual subordinate 6 bits of each of the respective color difference data Cr,Cb of each picture element are used to form a color histogram representing a frequency distribution.

The entry address forming unit 4 and the color histogram forming unit 5 are operated simultaneously and in parallel, and the look-up table forming unit 6 selects a color having the maximum frequency as a representative color on the basis of the results of the entry address forming unit 4 and the color histogram forming unit 5 to thereby form the look-up table.

Once a look-up table for a given original image is formed, in the approximate color display operation of an original image with 256 colors, superordinate 4 bits of brightness data Y and superordinate 2 bits of each of a pair of color difference data Cr,Cb are extracted from input image data comprising 8-bit brightness data Y and respective 8-bit color difference data Cr,Cb to form an entry address.

When an entry address of 8 bit is indicated, image data of 16 bits which are registered in the look-up table of the look-up table forming unit 6 as described above are read out in accordance with the indicated entry address irrespective of the content of the residual subordinate 4 bits of the brightness data Y and the residual subordinate 6 bits of each of the respective color difference data Cr, Cb. That is, the image data (color data) which appear at the maximum frequency in the original image are selected for the approximate color display of 256 colors.

According to the above-mentioned look-up table forming device, on the basis of a visual characteristic of human eyes that it would be possible to perform color reproduction with high quality if the ratio of the brightness data to each of the color difference data is kept to 4:2 (i.e., a 4:2 occupational band is ensured), a color histogram can be formed from original image data having 8-bit brightness data and a pair of respective 8-bit color difference data by using an entry address which is obtained by combining superordinate 4 bits of the brightness data and superordinate 2 bits of each of the respective color difference data.

Accordingly, through the process of forming an approximate image of 256 colors with representative colors which are extracted from an original image of 16,700,000 colors, color approximation in which the human visual characteristic is optimized is performed. Furthermore, a memory of the look-up table which has entry addresses of 256 may be designed in a small scale, so that the memory capacity can be saved. According to the look-up table forming method, the look-up table could be formed if the processing flow of the method is set to that of the look-up table forming device.

That is, the colors of an original image are roughly classified into $2^n$ colors (i.e., the original image are blocked into $2^n$ color blocks) on the basis of the entry address of n bits which is obtained by combining superordinate bits of brightness data and superordinate bits of each of a pair of color difference data of each picture element, a color histogram representing a color appearing frequency distribution of m bits is formed on the basis of the residual subordinate bits of the brightness data and the residual subordinate bits of each of the pair of the color difference data, and a look-up table is formed by selecting a color having the maximum appearing frequency as a representative color for every entry address. Therefore, the color histogram can be formed with the entry addresses of n bits obtained by combining the superordinate bits (totally n bits) of the brightness data and the pair of the color difference data from the original image data of (n+m) bits of the brightness data and the pair of the color difference data.

Accordingly, an original image of $2^{n+m}$ can be approximately displayed with an approximate color image of $2^n$ colors with high efficiency. Furthermore, since the memory scale of the look-up table which has a small number of entry addresses may be small, the memory capacity can be saved. Accordingly, according to the present invention can be provided the look-up table forming method and the look-up table forming device in which the approximate image faithful to the color distribution of the original image can be formed with high efficiency and at low cost.

As described above, according to the look-up table forming method of the present invention, superordinate bits of brightness data and superordinate bits of each of a pair of color difference data are extracted from image data in which totally (n+m) bits are allocated to both of brightness data and a pair of color difference data of each picture element, thereby forming an entry address of n bits (n, m represents a positive integer), a color histogram representing a frequency distribution of a color of m bits is formed on the basis of subordinate bits of the brightness data and subordinate bits of each of the pair of the color difference data in the image data which are roughly classified into $2^n$ colors, and then a color having the maximum frequency is selected as a representative color every entry address on the basis of the color histogram, thereby forming a look-up table. Therefore, the approximate image which is faithful to the color distribution of the original image can be formed with high efficiency.

Furthermore, according to the look-up table forming device of the present invention, superordinate bits of brightness data and superordinate bits of each of a pair of color difference data are extracted from image data in which totally (n+m) bits are allocated to both of brightness data and a pair of color difference data of each picture element, thereby forming an entry address of n bits (n, m represents a positive integer), a color histogram representing a frequency distribution of a color of m bits is formed on the basis of subordinate bits of the brightness data and subordinate bits of each of the pair of the color difference data in the image data which are roughly classified into $2^n$ colors, and then a color having the maximum frequency is selected as a representative color for every entry address on the basis of the color histogram, thereby forming a look-up table. Therefore, the approximate image which is faithful to the color distribution of the original image can be formed with high efficiency.

According to the look-up table forming method, superordinate 4 bits of brightness data and superordinate 2 bits of each of a pair of color difference data are extracted from image data in which 8×3 (=24) bits are totally allocated to both of brightness data of 8 bits and a pair of respective 8-bit color difference data of each picture element, thereby forming an entry address of 8 bits, a color histogram representing a frequency distribution of a color of 16 bits is formed on the basis of subordinate 4 bits of the brightness data and subordinate 6 bits of each of the pair of the color difference data in the image data which are roughly classified into 256 colors, and then a color having the maximum frequency is selected as a representative color every entry address on the basis of the color histogram, thereby forming a look-up table. Therefore, the approximate image which is faithful to the color distribution of the original image can be formed with high efficiency.

According to the look-up table forming device, superordinate 4 bits of brightness data and superordinate 2 bits of each of a pair of color difference data are extracted from image data in which 8×3 (=24) bits are totally allocated to both of brightness data of 8 bits and a pair of respective 8-bit color difference data of each picture element, thereby forming an entry address of 8 bits, a color histogram representing a frequency distribution of a color of 16 bits is formed on the basis of subordinate 4 bits of the brightness data and subordinate 6 bits of each of the pair of the color difference data in the image data which are roughly classified into 256 colors, and a color having the maximum frequency is selected as a representative color every entry address on the basis of the color histogram, thereby forming a look-up table. Therefore, the approximate image which is faithful to the color distribution of the original image can be formed with high efficiency.

What is claimed is:

1. A look-up table forming method, comprising the steps of:

extracting superordinate bits of brightness data and superordinate bits of each of a pair of color difference data from an image data in which totally (n+m) bits are allocated to both of brightness data and the pair of color difference data of each picture element, thereby forming an entry address of n bits, wherein n and m are positive integers;

forming a color histogram representing a frequency distribution of a color of m bits on the basis of subordinate bits of the brightness data and subordinate bits of each of the pair of the color difference data in the image data which are roughly classified into $2^n$ colors;

selecting a color having a maximum frequency in the image data as a representative color for every entry address, respectively, on the basis of the color histogram; and registering the representative color of every entry address, respectively, to form a look-up table.

2. The look-up table forming method as claimed in claim 1, wherein n and m are equal to 8 and 16 respectively, a bit rate of the brightness data and each color difference data is set to 2:1, and representative colors of $2^n$ are picked up in the order of the appearing frequency of the colors from colors of $2^m$ for an entry address of n bits.

3. The look-up table forming method as claimed in claim 1, wherein n<m.

4. A look-up table forming device, comprising:

means of extracting superordinate bits of brightness data and superordinate bits of each of a pair of color difference data from an image data in which totally (n+m) bits are allocated to both of brightness data and the pair of color difference data of each picture element, thereby forming an entry address of n bits, wherein n and m are positive integers;

means of forming a color histogram representing a frequency distribution of m bits on the basis of subordinate bits of the brightness data and subordinate bits of each of the pair of the color difference data in the image data which are roughly classified into $2^n$ colors;

means of selecting a color having a maximum frequency in the image data as a representative color for every entry address, respectively, on the basis of the color histogram; and means of registering the representative color of every entry address, respectively to form a look-up table.

5. The look-up table forming device as claimed in claim 4, further comprising a counter for counting a frequency of the color of m bits.

6. A look-up table forming method, comprising the steps of:

extracting superordinate 4 bits of brightness data and superordinate 2 bits of each of a pair of color difference data from an image data in which 8×3 (=24) bits are totally allocated to both of brightness data of 8 bits and the pair of respective 8-bit color difference data of each picture element, thereby forming an entry address of 8 bits;

forming a color histogram representing a frequency distribution of a color of 16 bits on the basis of subordinate 4 bits of the brightness data and subordinate 6 bits of each of the pair of the color difference data in the image data which are roughly classified into 256 colors;

selecting a color having a maximum frequency in the image data as a representative color for every entry address, respectively, on the basis of the color histogram; and registering the representative color of every entry address, respectively, to form a look-up table.

7. A look-up table forming device, comprising:

means of extracting superordinate 4 bits of brightness data and superordinate 2 bits of each of a pair of color difference data from an image data in which 8×3 (=24) bits are allocated to both of brightness data of 8 bits and the pair of respective 8-bit color difference data of each picture element, thereby forming an entry address of 8 bits;

means of forming a color histogram representing a frequency distribution of a color of 16 bits on the basis of subordinate 4 bits of the brightness data and subordinate 6 bits of each of the pair of the color difference data in the image data which are roughly classified into 256 colors;

means of selecting a color having a maximum frequency in the image data as a representative color for every entry address, respectively, on the basis of the color histogram; and means of registering the representative color of every entry address, respectively, to form a look-up table.

8. The look-up table forming device as claimed in claim 7, further comprising a counter for counting a frequency of the color of 16 bits.

* * * * *